United States Patent [19]

Spears

[11] Patent Number: 5,421,666
[45] Date of Patent: Jun. 6, 1995

[54] PIPE CONNECTOR FOR FRAMEWORK FABRICATION

[76] Inventor: Donald L. Spears, 17032 40th Ave. S., Seatac, Wash. 98188

[21] Appl. No.: 126,544

[22] Filed: Sep. 24, 1993

[51] Int. Cl.⁶ ............................ F04B 1/38; F16B 7/04
[52] U.S. Cl. .................... 403/176; 403/171; 403/169; 52/81.3; 52/655.2
[58] Field of Search ............... 446/126, 123, 119, 122; 52/655.1, 655.2, 646, 653.1, 81.3; 135/106, 101, 102, 105; 403/169–171, 176–178, 217, 396, 389

[56] References Cited

U.S. PATENT DOCUMENTS

| | | |
|---|---|---|
| 855,992 | 4/1908 | Graham . |
| 2,018,539 | 10/1935 | Welsh . |
| 2,474,727 | 6/1949 | Denier . |
| 2,922,653 | 1/1960 | O'Brien . |
| 3,424,178 | 1/1969 | Yazaki . |
| 3,476,421 | 11/1969 | Torres . |
| 3,632,147 | 1/1972 | Finger . |
| 3,648,404 | 3/1972 | Ogsbury et al. . |
| 3,792,882 | 2/1974 | Varichon . |
| 3,834,549 | 9/1974 | Burg et al. . |
| 3,881,830 | 5/1975 | Kato et al. . |
| 3,914,060 | 10/1975 | Miller et al. . |
| 4,021,127 | 5/1977 | Gasparro et al. . |
| 4,039,263 | 8/1977 | Bässler . |
| 4,065,890 | 1/1978 | Fenner . |
| 4,516,376 | 5/1985 | King . |
| 4,591,286 | 5/1986 | Inchaurbe . |
| 4,624,090 | 11/1986 | Stienen ............................ 52/655.2 |
| 4,637,805 | 1/1987 | Sweetin ............................ 446/126 |
| 4,673,308 | 6/1987 | Reilly . |
| 4,714,370 | 12/1987 | Chen . |
| 4,905,443 | 3/1990 | Sutcliffe et al. . |
| 4,915,533 | 4/1990 | de la Haye . |
| 4,922,669 | 5/1990 | De Pas et al. ....................... 52/655.2 |
| 5,074,700 | 12/1991 | Swoboda . |
| 5,169,258 | 12/1992 | Raynak . |

FOREIGN PATENT DOCUMENTS

| | | | |
|---|---|---|---|
| 247160 | 1/1961 | Australia . | |
| 3031551 | 3/1982 | Germany . | |
| 8101580 | 10/1982 | Netherlands | 446/122 |
| 8101581 | 10/1982 | Netherlands | 446/122 |

Primary Examiner—Randolph A. Reese
Assistant Examiner—Anthony Knight
Attorney, Agent, or Firm—Christensen, O'Connor, Johnson & Kindness

[57] ABSTRACT

Several cylindrical studs radiate from a spherical central hub to form a connector for joining adjacent ends of tubular structural members. The connector has six orthogonally arranged studs each sized to be fitted in an end portion of a structural member. The connector is formed in two identical halves secured together along a central plane bisecting four of the studs. The hub of the connector has a continuous peripheral wall, and the studs have tapered walls decreasing in thickness from such continuous peripheral wall outward toward the free ends of the studs. In a desired framework construction, one or more of the studs can be cut off without exposing the interior of the hub or jeopardizing the strength of the connector.

17 Claims, 5 Drawing Sheets

PIPE CONNECTOR FOR FRAMEWORK FABRICATION

FIELD OF THE INVENTION

The present invention relates to branched joints and connections between elongated structural members of a framework.

BACKGROUND OF THE INVENTION

There are a multitude of known connectors for joining adjacent ends of elongated structural members to form a framework, most of which are of complicated shape and require structural members having ends of special design. Consequently, such connectors and the structural members usable with them are expensive. They also are complicated and time consuming to use.

There have been prior attempts to provide a simpler connector in the form of a central hub having radiating studs insertable into adjacent ends of tubular structural members. Varichon U.S. Pat. No. 3,792,882, issued Feb. 19, 1974, discloses such a connector having six orthogonally arranged "cylindrical stubs" for fitting into the ends of resilient metal structural tubes having longitudinal slits.

Raynak U.S. Pat. No. 5,169,258, issued Dec. 8, 1992, discloses a multipiece connector including a central hub portion and a peg insertable through such central portion to provide "connection pins" insertable into the ends of tubular members.

Yazaki U.S. Pat. No. 3,424,178, issued Jan. 28, 1969, discloses a variety of connector members having studs at different angles for interconnecting tubular structural members to form frameworks, with the studs and structural members having cooperating interfitting components for a bayonet mount.

The preferred joint of the construction shown in O'Brien U.S. Pat. No. 2,922,653, issued Jan. 26, 1960, also uses bayonet mounts and includes studs fittable in the ends of tubular structural members. In the case of the O'Brien construction, however, at least some of the studs are hinged so that a desired framework can be knocked down to compact form.

Ogsbury et al. U.S. Pat. No. 3,648,404, issued Mar. 14, 1972, also is concerned with branched joints or connectors including studs insertable into the ends of tubular structural members in such a way as to allow the angular positions of the structural members to be adjusted.

King U.S. Pat. No. 4,516,376, issued May 14, 1985, discloses yet another type of branched connector having studs of special design insertable into tubular structural members, including one form (FIG. 11) in which six orthogonally arranged studs project from a central square block.

Finally, Kato et al. U.S. Pat. No. 3,881,830, issued May 6, 1975, discloses additional forms of branched connectors, some of which have six orthogonally arranged studs for fitting in adjacent ends of tubular structural members to form a framework.

In general, despite prior efforts, of which the constructions shown in the above-identified patents are representative, there still exists a need for an inexpensive branched connector for joining adjacent ends of standard tubular structural members to achieve a strong, secure joint, but which is easy to manufacture and use.

SUMMARY OF THE INVENTION

The present invention provides an improved connector for joining adjacent ends of tubular structural members, preferably standard PVC pipes. Such connector has several studs projecting from a central hub. In the preferred embodiment, the connector has six orthogonally arranged studs projecting outward from a generally spherical hub. The connector can be formed in two identical halves secured together along a central plane bisecting four of the studs. The four bisected studs of each half are semicylindrical. Aligned studs at opposite sides of the hub have projecting tabs for interfitting with the studs of the other connector half. Connector halves can be secured to an existing upright panel or wall to form an anchor point for cross members or beams of a desired framework.

Preferably, the hub of the connector in accordance with the present invention has a continuous peripheral wall from which the cylindrical studs project. The studs themselves have tapered walls decreasing in thickness outward toward their free ends. In a desired framework construction, one or more of the studs can be cut off without exposing the interior of the hub or jeopardizing the strength of the connector.

In addition, the four bisected studs have holes spaced outward from the peripheral wall of the hub. After a pipe end has been inserted over one of such studs to a position engaged against the hub, a hole can be drilled in the pipe end portion in alignment with the holes through the stud such that a pin can be inserted through the aligned pipe and stud holes. In this way, a temporary but sturdy interconnection of the pipe ends and the connector can be achieved. The pins can be molded integrally with the connector halves in such a way so as to be manually separable from the halves.

In addition to the orthogonal interconnection of the structural pipes, other fittings such as elbows can be secured over selected studs. Pipes extending between the fittings can form diagonal braces or bowed rafters, for example.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
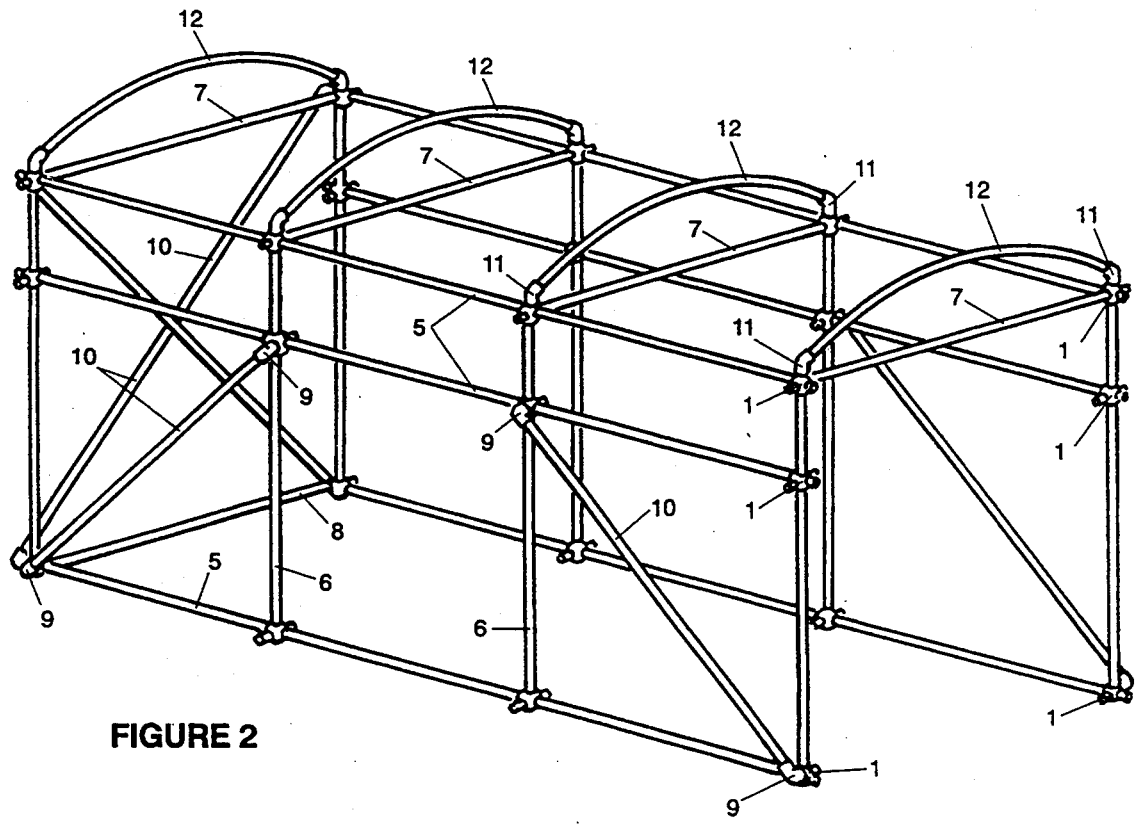
FIG. 2 is a somewhat diagrammatic top perspective of a representative framework that can be fabricated using the connector of FIG. 1.
Figure 1:
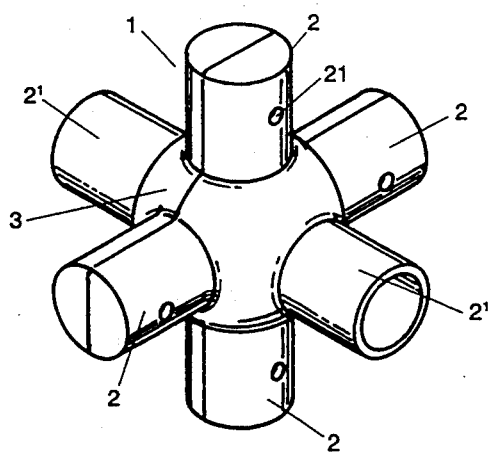
FIG. 1 is top perspective of a pipe connector for framework fabrication in accordance with the present invention.

With reference to FIG. 1, the connector 1 in accordance with the present invention has six substantially cylindrical studs 2 and 2' projecting from a central hub 3 in mutually orthogonal relationship. In general, the studs are sized to be snugly received in adjacent ends of tubular structural members, preferably standard Schedule 40 PVC pipes. Such connector can be used in fabricating a temporary or permanent framework of which the framework 4 illustrated in FIG. 2 is representative.

More specifically, framework 4 includes horizontal longitudinal stringers 5, vertical posts 6, and top and bottom cross members or beams 7 and 8, respectively, each of which can be a standard PVC pipe cut to the desired length. Each stringer, post and beam has its opposite end portions telescoped over and secured on studs of identical connectors 1. Aligned stringers or posts are inserted over studs at opposite sides of a connector, and each stringer is joined to a post by use of adjacent studs of a single connector. The result is a sturdy rectangular array of stringers and posts at each side of the framework 4. The opposite sides of the framework are interconnected by the cross members or beams 7 and 8.

Additional rigidity can be achieved by securing corresponding arms of 90° elbows 9 to outward projecting studs of connectors located diagonally opposite from each other in one rectangular part or cell of the framework. A diagonal brace 10, which also is a standard PVC pipe, can extend between the other arms of the elbows. Similarly, 45° elbows 11, or elbows of a lesser angle, can be attached to the top studs of the uppermost connectors 1. Such elbows 11 are used for securing bowed rafter pipes 12 over the top of the framework. A representative use for a framework of the general type shown in FIG. 2 is as a temporary or permanent shelter which can be completed by lashing a tarp over the top-and, if desired, the sides of the framework. The framework then can be used as a light temporary or permanent shelter for protecting an automobile, boat or recreational vehicle, for example.

Figure 3:
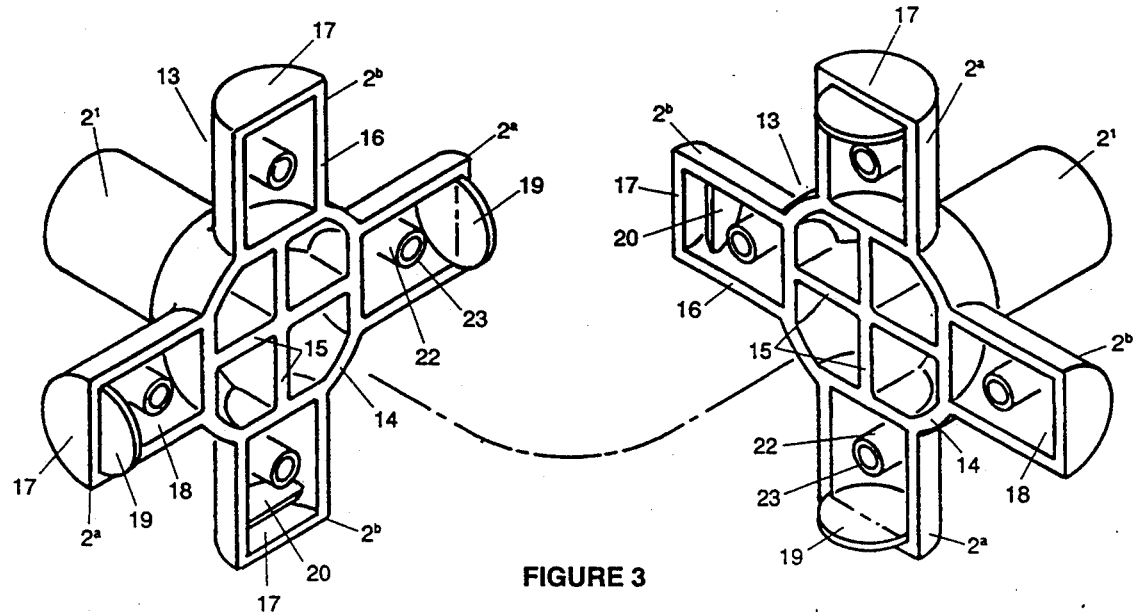
FIG. 3 is an enlarged top perspective of the connector of FIG. 1 with the connector halves shown in exploded relationship.
Figure 4:
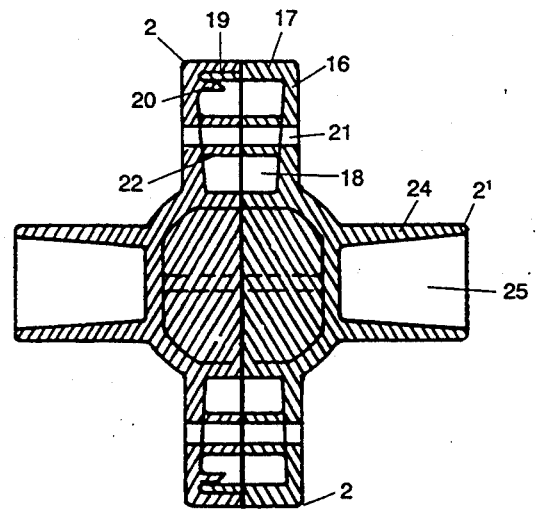
FIG. 4 is a vertical section of the connector of FIG. 1 taken perpendicular to the plane between the connector halves.
Figure 5:
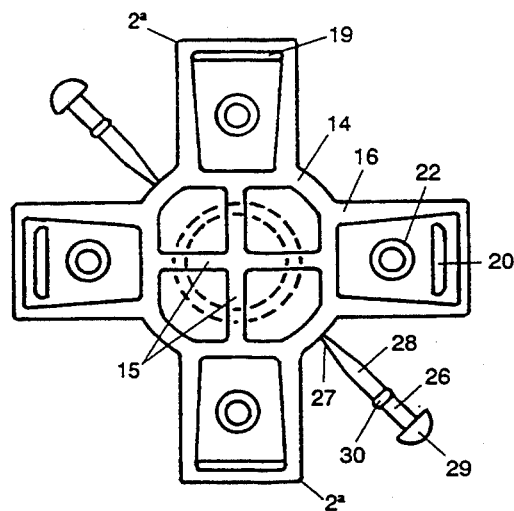
FIG. 5 is an inner end elevation of one half of a connector in accordance with the present invention.
Figure 7:
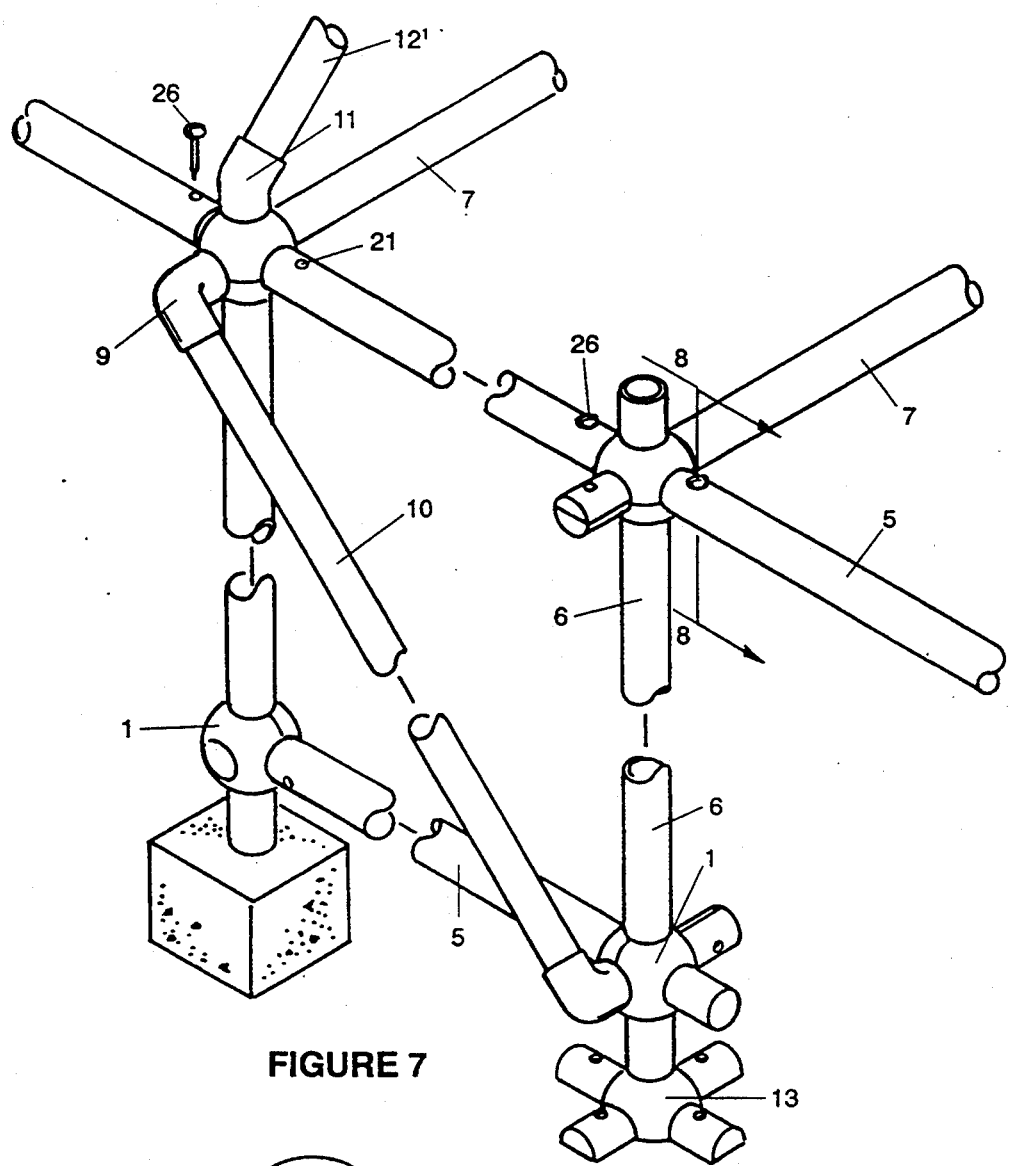
FIG. 7 is a top perspective of a fragment of a framework that can be formed by use of the connector in accordance with the present invention.

With reference to FIGS. 3, 4 and 5, preferably the connector 1 in accordance with the present invention is formed of two identical halves 13 molded of strong rigid plastic. Such halves are secured together along a central plane which bisects four of the studs. As best seen in FIG. 3, each half 13 has a substantially hemispherical peripheral hub shell or wall 14 and integral diametrally extending reinforcing plates 15. Each of the bisected studs has a semicylindrical sidewall 16 and a flat semicircular end wall 17 closing the interior cavity 18 formed by sidewall 16. The inner edges of the hub wall 14, reinforcing plates 15 and stud walls 16 and 17 lie in a common plane for contiguous engagement against the corresponding edges of the other connector half 13.

Diametrally opposite stud halves 2a of each connector part 13 have thin registration tabs 19, preferably semicircular, projecting from the radially inner portions of their end walls 17. The other stud halves 2b have interior transversely extending ribs 20 spaced inward from the radially inner surfaces of the adjacent end walls 17. Ribs 20 and the adjacent inner surfaces of walls 17 define narrow grooves for snugly receiving the projecting end portions of the tabs 19, as best seen in FIG. 4, to assist in holding the two connector halves 13 together and in registration as they are joined by suitable adhesive or otherwise are fused together.

The peripheral wall 16 of each bisected stud 2a or 2b preferably has a through hole 21 positioned to register with the corresponding hole in the other stud half. A cylindrical reinforcing collar 22 having a bore coaxial with but of a diameter slightly greater than the diameter of each hole 21 is molded integrally with the remainder of the connector half. Collars 22 have edges 23 coplanar with the exposed edges of the walls 14, 16 and 17 and plates 15. When the two connector halves are joined together, each of the bisected studs has a continuous through passage extending transversely of the stud.

The other studs 2' of the composite connector 1 project perpendicular to the central bisecting plane. Each of such studs 2' has a generally cylindrical peripheral wall 24 but no end wall. Rather, the outer ends of studs 2' are open. As best seen in FIG. 4, preferably each peripheral wall 24 tapers in thickness outward from the hub 3 toward the free end of the stud, but the outer periphery of the stud is nearly cylindrical as compared to the interior cavity 25 which is substantially frustoconical. Similarly, as best seen in FIG. 5, the peripheral walls 16 of the bisected studs 2 taper in thickness from the wall 14 of hub 2 toward their outer ends. The thicker inner portions of the stud walls 16 and 24 strengthen the area where they join the hub wall 14. Preferably, the tapering of the stud walls is uniform, with the thickness of the stud walls adjacent to the hub wall 14 being at least about twice the thickness adjacent to the outer ends of the studs.

As also seen in FIG. 5, each half 13 of the connector can have elongated pins 26 molded integrally with it. Each pin has a pointed tip 27 joined to the hub wall 14 between adjacent stud halves 2a and 2b. The tip is sharp so that the pin can be broken from the remainder of the connector half manually. Each pin 26 has a central shank 28 sized to fit in the stud holes 21, and an outer enlarged head 29 limiting insertion of the pin into a hole. The shank has an enlarged circumferential rib 30 for snugly fitting in the inner collars 22 so as to retain a pin in its inserted position.

Figure 6:
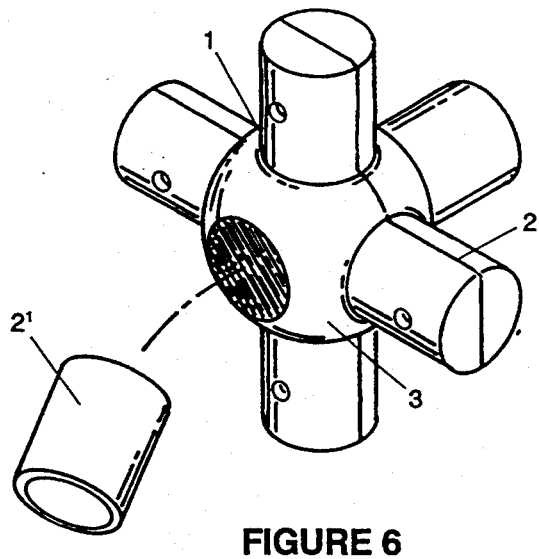
FIG. 6 is a top perspective of the connector of FIG. 1 illustrating the condition of the connector after a stud of the connector is cut away.
Figure 8:
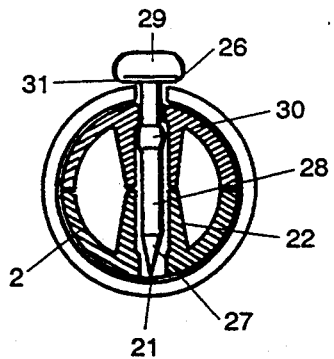
FIG. 8 is a vertical section along line 8—8 of FIG. 7.

A desired framework can be formed quickly and easily by telescoping the end portions of the desired tubular structural members, preferably Schedule 40 PVC pipes, over the appropriate studs and securing them in position, such as by suitable adhesive. Preferably, there is a snug fit of the pipe ends on the studs. As illustrated in FIG. 6, unused projecting studs can be cut away without exposing the interior of the hub or jeopardizing its structural integrity, while allowing a more finished look of the framework.

For a less permanent framework, the connectors are oriented so that most of the structural members are fitted over the bisected studs 2 which have the aligned holes for the connection pins 26. With reference to FIG.

8, before or after the end portion of the pipe has been inserted over a stud 2, a hole 31 is drilled through the wall of the pipe to be in alignment with the stud holes 21. When the pipe is fitted on the stud, the connection is completed by inserting one of the connection pins 26 into the aligned holes. As described above, the internal diameter of the reinforcing collars 22 is slightly greater than the diameter of the adjacent hole 21. The rib 30 on the pin shank is sized to snap tightly through a hole 21 for normally retaining the pin in position. Preferably, the overall length of the pin shank, including its pointed end, is approximately equal to the inner diameter of the pipe plus its wall thickness, so that only a single hole in the pipe end is required. Longer pins would require that a hole be drilled diametrally through opposite sides of the pipe wall. For studs 2' not having preformed holes, holes can be drilled at the same time that the pipe is drilled.

Figure 9:
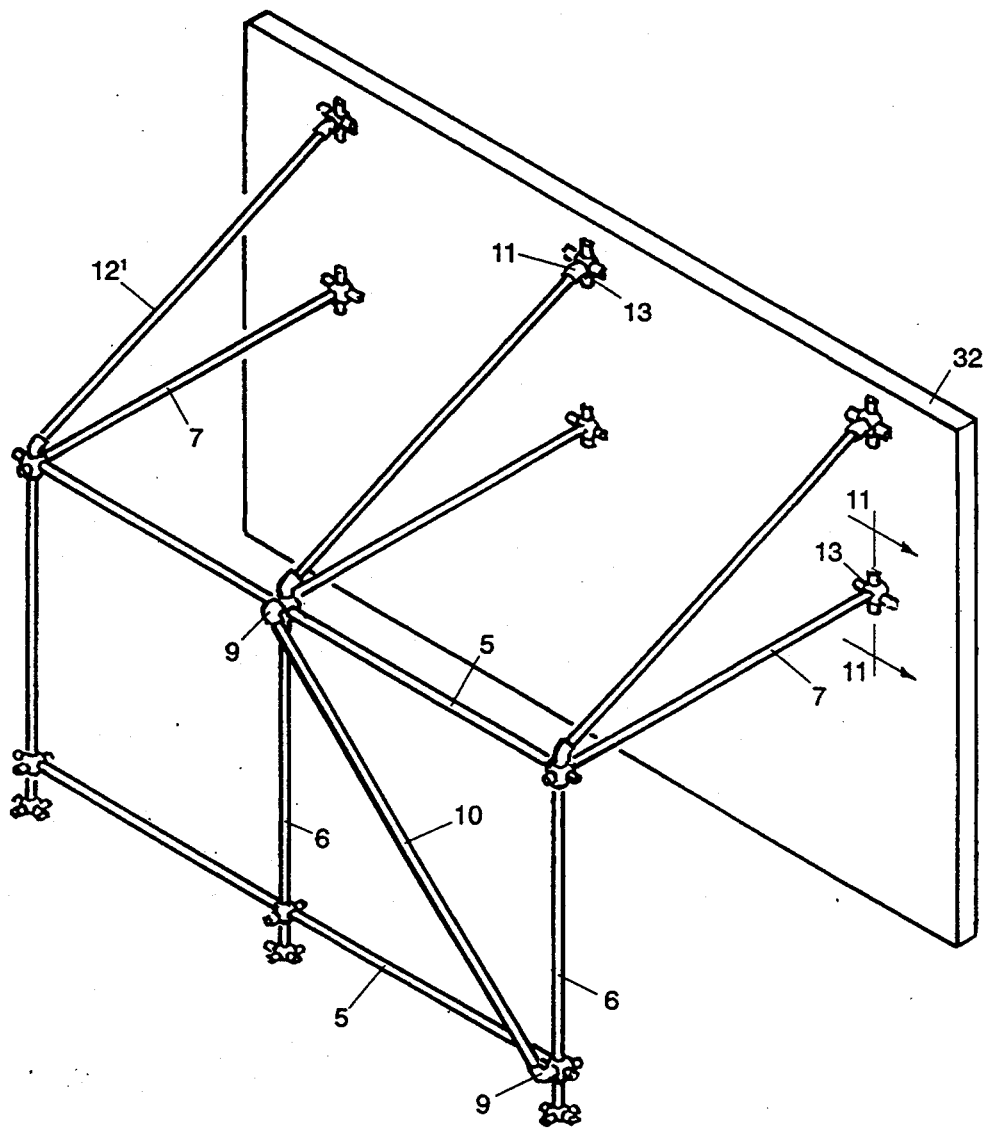
FIG. 9 is a somewhat diagrammatic top perspective of another representative framework that can be formed by use of the connector in accordance with the present invention.
Figure 11:
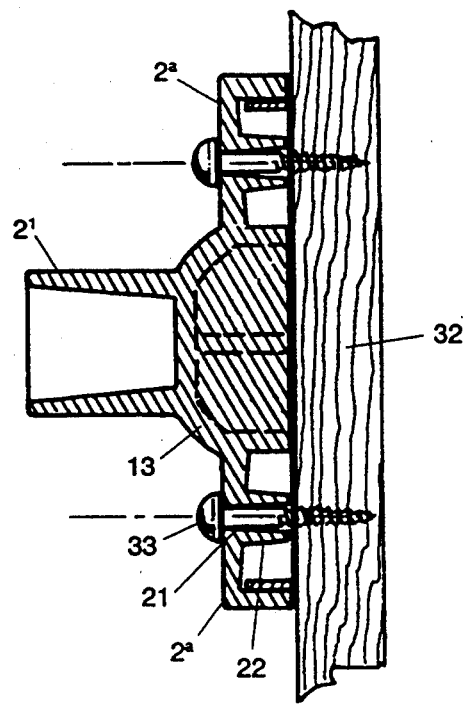
FIG. 11 is a vertical section along line 11—11 of FIG. 9.
Figure 10:
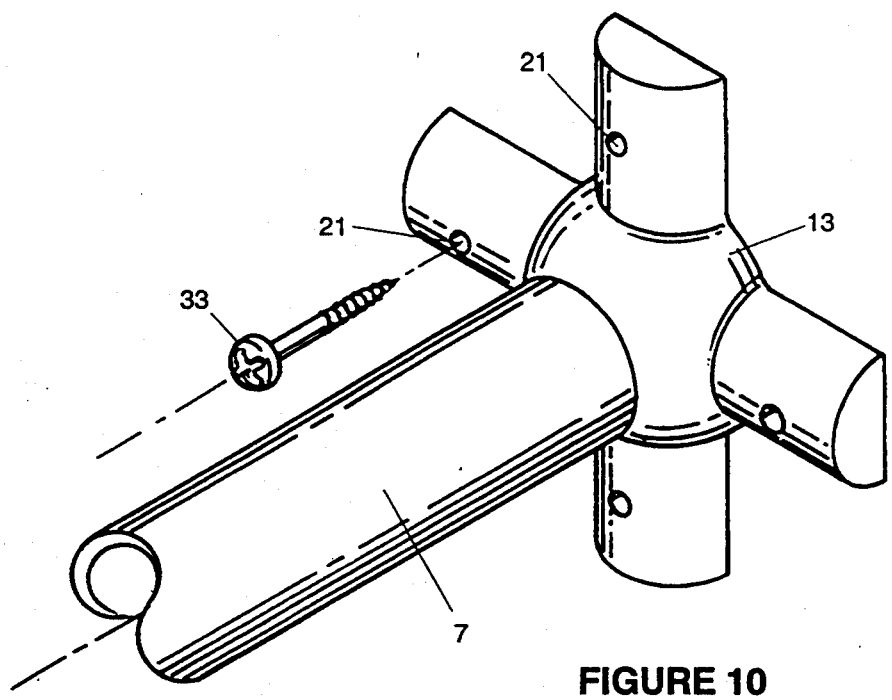
FIG. 10 is an enlarged top perspective of part of the framework of FIG. 9.

With reference to FIG. 9, in some cases it may be desirable to form a framework in conjunction with an existing upright wall or panel 32. At one side, stringer pipes 5, posts 6, elbows 9 and one or more braces 10 can be joined together as described above. Beams 7, elbows 11 and rafter pipes 12' can be connected to the top connectors 1 of the resulting upright side frame. For the wall side of the framework, connector halves 13 can be prepared by first cutting or breaking off the projecting tabs such that the entire rear face of the connector halves are planar and can be set flat against the vertical outer surface of the wall. As illustrated in FIGS. 10 and 11, the connector halves can be joined to the wall at the appropriate locations by fasteners 33 extending through the holes 21 of the bisected studs 2. Then the desired structural members can be connected to the cylindrical studs 2' that project perpendicular from the wall or, with reference to FIG. 9, elbow fittings can be connected to the studs for angled structural members, such as rafter pipes 12'.

While the preferred embodiment of the invention has been illustrated and described, it will be appreciated that various changes can be made therein without departing from the spirit and scope of the invention. For example, a wide variety 0f different types of sturdy frameworks can be formed quickly and easily by the connectors of the present invention and standard pipes and fittings.

The embodiments of the invention in which an exclusive property or privilege is claimed are defined as follows:

1. A connector for structural tubular members comprising a central hub having a continuous peripheral shell wall, and several studs integral with and projecting from said hub, said continuous peripheral shell wall defining a closed wall across the base of said studs and said studs being sized to be fitted snugly in the tubular structural members, some of the studs having integral end walls remote from the central hub and closing the interior cavities of the studs.

2. The connector defined in claim 3, in which the cavities of a plurality of the studs open outward at the ends of the studs remote from the central hub.

3. The connector defined in claim 3, in which the studs have tapered interior cavities defining the inner peripheries of the shell walls of the studs, the outer peripheries of the studs being substantially cylindrical, and the stud shell walls tapering in thickness outward from the continuous peripheral shell wall of the central hub.

4. The connector defined in claim 3, in which the interior cavities of the shell walls of the studs are substantially frustoconical.

5. The connector defined in claim 4, in which the thickness of the shell walls of the studs adjacent to the peripheral wall of the hub is at least about twice the thickness of the shell walls adjacent to their end portions remote from the continuous peripheral wall of the central hub.

6. The connector defined in claim 3, in which the central hub has an interior cavity, and including diametrally extending reinforcing ribs integral with the peripheral wall of the hub.

7. The connector defined in claim 1, in which the studs are arranged in mutually orthogonal relationship for interconnecting tubular members in a three-dimensional rectangular array.

8. A connector for structural tubular members comprising a central hub having a continuous peripheral shell wall, and several studs integral with and projecting from said hub, said continuous peripheral shell wall defining a closed wall across the base of said studs and said studs being sized to be fitted snugly in the tubular structural members, several of the studs having continuous through passages extending transversely thereof including holes through the shell walls of the studs.

9. The connector defined in claim 8, including collars defined by the studs having through bores coaxial with the holes and positioned inside the studs having the holes.

10. The connector defined in claim 9, in which the diameter of the through bores of the collars, is slightly greater than the diameter of the holes in the shell walls of the studs.

11. The connector defined in claim 8, in which the studs are arranged in mutually orthogonal relationship for interconnecting tubular members in a three-dimensional rectangular array.

12. A connector for structural tubular members comprising a central hub having a continuous peripheral shell wall, and several studs integral with and projecting from said hub, said continuous peripheral shell wall defining a closed wall across the base of said studs and said studs being sized to be fitted snugly in the tubular structural members, the connector being formed by two halves meeting substantially contiguously at a central plane bisecting at least some of the studs.

13. The connector defined in claim 12, in which the studs are arranged in mutually orthogonal relationship for interconnecting tubular members in a three-dimensional rectangular array.

14. The connector defined in claim 12, in which the connector halves have interfitting registration tabs and recesses for aligning the bisected studs.

15. A connector for structural tubular members comprising two identical halves, each half having a generally hemispherical hub defining half of a closed body and a plurality of stud halves projecting from said hub, said stud halves and said hemispherical hub having coplanar inner edges meeting the inner edges of the other half substantially contiguously and joined thereto.

16. The connector defined in claim 15, in which the stud halves have registered apertures, and including connector pins having shanks for fitting in said apertures, said connector pins being formed integrally with the stud halves but being manually separable therefrom.

17. A structural framework comprising:

an array of connectors each having a central hub including a continuous peripheral shell wall and several studs integral with and projecting from said hub;

several pipes extending between selected connectors and each having hollow opposite end portions fitted over studs of adjacent connectors and secured thereto, wherein the studs of each connector are arranged in mutually orthogonal relationship and the pipes are interconnected with the studs in a rectangular array; and elbow fittings connected to studs of connectors disposed diagonally opposite each other in the rectangular array, and a diagonal brace pipe connected between and secured to said elbow fittings.

* * * * *

UNITED STATES PATENT AND TRADEMARK OFFICE
CERTIFICATE OF CORRECTION

PATENT NO. : 5,421,666  Page 1 of 2
DATED : June 6, 1995
INVENTOR(S) : D.L. Spears It is certified that error appears in the above-indentified patent and that said Letters Patent is hereby corrected as shown below: On the title page:

| COLUMN | LINE | |
|---|---|---|
| [56] col. 1 | Refs. Cited U.S. Pat. Docs. | "855,992" should read --885,992-- |
| [56] col. 2 | Refs. Cited For. Pat. Docs. | Before "3031551" insert --DT-- |
| 1 | 23 | "stubs" should read --studs-- |
| 2 | 51 | "is top" should read --is a top-- |
| 3 | 20 | After "snugly" delete --,-- |
| 5 | 29 | "fiat" should read --flat-- |
| 5 | 43 | "variety 0f" should read --variety of-- |
| 5 (Claim 2, line 1) | 59 | "claim 3" should read --claim 1-- |
| 5 (Claim 3, line 1) | 62 | "claim 3" should read --claim 1-- |

UNITED STATES PATENT AND TRADEMARK OFFICE
CERTIFICATE OF CORRECTION

PATENT NO. : 5,421,666  
DATED : June 6, 1995  
INVENTOR(S) : D.L. Spears

Psge 2 of 2

It is certified that error appears in the above-indentified patent and that said Letters Patent is hereby corrected as shown below:

| COLUMN | LINE | |
|---|---|---|
| 6 | 10 | "claim 3" should read --claim 1-- |
| (Claim 6, | line 1) | |

Signed and Sealed this

Twenty-fourth Day of October, 1995

Attest:

BRUCE LEHMAN

*Attesting Officer*  *Commissioner of Patents and Trademarks*